stant food and their manufacturing method

[75] Inventors: Yoshinobu Hase; Masaaki Yamauchi, both of Osaka; Ryozo Handa, Hirakata, all of Japan

[73] Assignee: Kanebo Foods, Ltd., Tokyo, Japan

[21] Appl. No.: 870,025

[22] Filed: Jan. 16, 1978

[51] Int. Cl.² ............................................. A23L 1/20
[52] U.S. Cl. ...................................... 426/44; 426/46; 426/50; 426/52; 426/103; 426/309
[58] Field of Search ....................... 426/44, 46, 49, 50, 426/52, 48, 629, 634, 103, 309; 195/31 R, 267, 272, 274, 99

[56] References Cited

U.S. PATENT DOCUMENTS

| 2,278,470 | 4/1942 | Musher | 426/46 X |
|---|---|---|---|
| 3,510,313 | 5/1970 | Steinkraus et al. | 426/634 |
| 3,640,723 | 2/1972 | Uhlig et al. | 426/46 |
| 3,867,553 | 2/1975 | Hitze et al. | 426/44 |
| 4,119,733 | 10/1978 | Hsieh et al. | 426/49 X |

FOREIGN PATENT DOCUMENTS

| 45-32220 | 10/1970 | Japan | 426/52 |
|---|---|---|---|
| 50-13350 | 5/1975 | Japan | 426/634 |

*Primary Examiner*—Esther M. Kepplinger
*Attorney, Agent, or Firm*—Cushman, Darby & Cushman

[57] ABSTRACT

Processed dried beans which almost instantaneously restore their boiled soft edible condition without a loss of the taste and flavor peculiar to the beans, simply by pouring hot water onto the processed dried beans, and the manufacturing method of such dried beans. Raw beans are first boiled in water, and thereafter they are treated with a solution of an enzyme selected from a group consisting of cellulose, pectinase and a mixture thereof, with or without subsequent boiling of beans in water. The processed dried beans may have a coating of sucrose or lactose. The beans are limited to those which are rich in starch and poor in both protein and fat.

21 Claims, No Drawings

PROCESSED DRIED BEANS AS INSTANT FOOD AND THEIR MANUFACTURING METHOD

BACKGROUND OF THE INVENTION (a) Field of the Invention

The present invention relates to processed dried pulses which are almost instantaneously restored to the soft edible condition of boiled raw pulses. More particularly the invention pertains to such processed dried pulses are described above which can be restored in a very short period of time to their boiled soft edible condition simply by pouring hot water onto the processed dried pulses, and the invention pertains to a method for manufacturing such pulses.

In order to facilitate the understanding of the present invention, the word "pulses" will hereunder be substituted by the word "beans" which will signify collectively various kinds of pulses, throughout the specification and the claims.

The beans which are suitable for use in the present invention are those beans which are rich in starch and poor in both protein and fat.

(b) Description of the Prior Art

The methods for producing processed dried beans which quickly restore the soft edible condition of boiled raw beans, include the following known methods: (1) a method comprising first softening raw beans by boiling the beans together with a softening promoter such as polyphosphate to soften also their seed coat, and thereafter immersing the resulting softened beans in a solution such as a sucrose solution, followed by drying the resulting solution-treated beans in heated air; (2) a method comprising first boiling and softening raw beans, and then freezing the resulting beans and thereafter drying them in heated air; and (3) a method of producing processed dried beans by simultaneously freezing and drying the boiled softened raw beans in vacuo.

However, the processed dried beans produced in accordance with the above-mentioned known method (1) are not easily and quickly restored to their soft boiled condition by merely pouring hot water thereonto. Whereas, those processed dried beans produced in accordance with the method (2) mentioned above are not satisfactorily and quickly restored to soft boiled condition though these characteristics are improved a little as compared with those processed dried beans obtained by the method (1). Furthermore, those processed dried beans produced in accordance with the freezing-drying treatment of the method (3) lack their original flavor and natural good feel to tongue since the textures and tissues of the cells of the beans themselves have been indiscriminately destroyed during the freezing-drying treatment.

The inventors of the present invention have undertaken strenuous and extensive research and experiments to eliminate the above-discussed difficulties and disadvantages of the known instantaneously restorable processed dried beans, and at last they have successfully worked out the present invention.

As a result, it has been found that raw beans which have been defined as above and which can be used in making a paste of beans, can be converted to dry bean products which are easily restored to their hydrated state. The raw beans are first boiled at least once in a boiling water, and thereafter they are subjected to an enzymatic reaction (treatment with an enzyme) by immersing the boiled raw beans in an aqueous solution containing an enzyme which is either cellulase or pectinase or both, with or without subsequently subjecting the resulting beans again to boiling treatment at least once in boiling water; and thereafter the beans are dried. The enzyme acts on the pectic intercellular substances or acts on the cellulosic substances existing in the cell walls of the boiled beans to uniformly and effectively destroy the cell tissues existing in and around the seed coat and the epidermis of the seed lobe (catyledon) of each bean. The enzyme action improves the permeation of hot water into the core of each bean and improves the ability of the product processed dried beans to be restored to the condition of boiled beans immediately upon contacting hot water. In addition, the beans which have been processed in this way retain the original taste and flavor which are peculiar to the boiled raw beans (as represented by fragrance, the after-taste and sweetness, as well as an agreeable feel to tongue, agreeableness to taste, glutinousness, agreeable coarseness and the like,) when the dried beans are subjected to hot water to hydrate them to restore the boiled soft condition. Furthermore, it has been found also that the processed dried beans according to the present invention which are suitable for being used as what is called "instant food" can be manufactured advantageously on the industrial basis.

SUMMARY OF THE INVENTION

It is, therefore, a primary object of the present invention to provide processed dried beans which hydrate substantially instantaneously to the condition of boiled soft raw beans and which are free of the difficulties and disadvantages of known processed dried beans discussed above, and to provide methods for manufacture.

Another object of the present invention is to provide those processed dried beans and a method for their manufacture as described above, which readily and perfectly restore in a very short period of time to the soft edible condition of boiled raw beans substantially without a loss of the pleasant taste and flavor of the original beans, just by a simple step of pouring hot water thereonto during subsequent cooking.

Still another object of the present invention is to provide those processed dried beans and a method for their manufacture as described above, which comprises boiling raw beans at least once in boiling water, thereafter subjecting the resulting boiled beans to a treatment in an aqueous solution containing either cellulase or pectinase or a mixture thereof, and then optionally subjecting the resulting treated beans at least once to boiling in boiling water again, and finally drying these beans.

DETAILED DESCRIPTION OF THE PREFERRED EMBODIMENTS

The processed dried beans of the invention may be produced from various kinds of beans which are rich in starch and poor in both protein and fat, and which are suitable for subsequent preparation of a paste of boiled beans simply by pouring hot water onto the processed dried beans. The paste of boiled beans can be prepared easily by merely pulverizing or grinding or mashing or kneading the beans in their boiled condition restored. The beans which are suitable for use in the present invention include Adzuki beans (*Phaseolus angularis*), Peyin beans (*Phaseolus calcaratus*), Kidney beans (*Phaseolus vulgaris*), Scarlet rummers (*Phaseolus coc-*

*cineus*), Lima beans (*Phaseolus lumates*), Peas (*Pisum sativum*), Broad beans (*Vicia faba*), Cuba beans (*Vigna sinenis*), and Catiang (*Vigna catiang*). Those beans such as peanuts and soy beans which are rich in fat and protein are not suitable for use in the present invention. Powdered beans which are obtained after the processed dried beans are first brought into contact with hot water to restore the initial boiled soft condition and then are mashed may be used for the preparation of "Zenzai" or "Shiruko" each of which is a sweetened soup of either mashed boiled beans or of soft but independent pieces of boiled beans, respectively.

Cellulase which is used in the present invention is an enzyme which exhibits an enzymatic reaction on cellulosic substances such as cellulose and hemi-cellulose. For example, the cellulase which is produced by *Trichoderma viride* bacilli (e.g. Cellulase Onozuka which is the commercial name of the product of Kinki Yakurt Co., Ltd. of Japan), the cellulase which is produced by *Irpex lacteus* bacilli (e.g. Driserase which is the commercial name of the product of Kyowa Hakko Co., Ltd. of Japan), and the cellulase which is produced by *Trichoderma koningi* bacilli (e.g. Meicelase which is the commercial name of the product of Meiji Seika Co., Ltd. of Japan) are especially preferable. On the other hand, the cellulase which is produced by *Aspergillus niger* bacilli, which is an analogous cellulase, (e.g. Takamine Cellulase which is the commercial name of the product of Chemische Fabrik Naarden of Holland, or Cellulosin AP and Cellulosin AC of Ueda Kagaku Co., Ltd. of Japan), or the cellulase which is produced by *Fusarium moniliforme* bacilli (e.g. Toyo-Cellulase of Toyo Jozo Co., Ltd. of Japan), or Celluzyme and Cellulase-Nagase of Nagase Sangyo Co., Ltd. of Japan, and FA-53-1 of Sankyo Co., Ltd. of Japan, are found to be somewhat inferior to the first-mentioned cellulases when such cellulase is used independently; however, these latter cellulases can be employed jointly with the first-mentioned cellulases or with the pectinase which will be described later.

Pectinase which is used in the present invention is an enzyme which exhibits an enzymatic reaction on pectin-containing substances. For example, the pectinase which is produced by *Rhizopus arrhizus* bacilli (e.g. the Macerozyme which is the commercial name of the product of Kinki Yakurt Co., Ltd. of Japan, and the pectinase which is produced by *Coniothrium diplodiella* bacilli (e.g. Sclase S which is the commercial name of the product of Sankyo Co., Ltd. of Japan) are especially preferred.

In the present invention, there is used, as an enzymatic treatment solution, an aqueous solution containing either cellulase or pectinase, or a combination of both of the cellulase and the pectinase as mentioned above. In case cellulase alone is used, the amount used in the present invention ranges from 0.1 to 5.0% by weight, preferably from 0.4 to 1.0% by weight, based on the weight of the beans employed. Whereas, similarly the amount of pectinase, in case the pectinase alone is used, ranges from 0.1 to 6.0% by weight, preferably from 0.5 to 1.5% by weight, based on the weight of the beans used. Also, in case a combination of cellulase and pectinase is intended, the respective amounts of these two enzymes are: 0.1 to 3.0% by weight, preferably 0.3 to 1.0% by weight, of cellulase, and 1.0 to 4.0% by weight, preferably 0.3 to 1.0% by weight of pectinase. The solution of these enzymes, either individually or in combination, which is to be applied to the already boiled raw beans is prepared by dissolving a required amount of enzyme in a required amount of water. In the event that cellulase and/or pectinase is added to boiled beans in an amount less than the above-indicated ranges, the processed dried beans will tend to possess a decreased ability to restore to their initial boiled soft condition and also a lowered degree of taste, flavor and so forth when the product dried beans are brought into contact with hot water during cooking, as compared with the processed dried beans treated with cellulase and/or pectinase of an amount falling within the above-mentioned ranges. On the other hand, the use of an amount of such enzyme or enzymes in excess of the above-mentioned ranges shows no substantial change in the effect of the enzymes, but use of excessive amounts of enzymes is not desirable from the viewpoint of cost.

When the effect obtained by using a single enzyme selected from cellulase and pectinase in accordance with the invention is compared with the effect obtained by using a combination of said two enzymes, it has been noted that a combined use of cellulase and pectinase is most preferred. If only a single enzyme, either cellulase or pectinase, is used, it has been noted that the use of cellulase alone gives a better result than does the use of pectinase alone.

The pH of the enzyme solution which is to be used in the present invention will vary depending on the type of the enzyme employed. However, it has been noted that ordinarily an appropriate range of the value of pH is from 3.0 to 7.0. The most desirable pH value is in the range of 3.0 to 5.0 in the case where cellulase alone is used, as contrasted by the range of from 3.5 to 6.5 where pectinase alone is used. The most preferred range of the value of pH for the combined use of cellulase and pectinase is from 3.5 to 5.0. In order to make adjustment of the pH value of the enzyme solution, it is possible to use an organic acid such as citric acid, acetic acid and the like, or to use a buffering agent. Also, in order to promote the enzyme reaction, any activating agent may be added. The temperature of the enzyme solution is determined depending on the optimum temperature for the optimum exhibition of the activity of the enzyme employed. However, it has been noted that ordinarily a temperature in the range of from 30° to 50° C., preferably 40° to 45° C., is suitable.

The amount of the enzyme solution ordinarily used is an amount as is enough to immerse the beans completely in the solution. Usually, the amount of enzyme solution is 2 to 5 times the weight of the beans. It should be noted that this amount of solution applies in the same way to other solutions employed in the present invention.

The treatment of beans with an enzyme or enzymes, i.e. the enzymatic reaction, is carried out so as to establish good contact between the beans and the enzyme solution. Such treatment may be performed in practice by either leaving the beans immersed in the enzyme solution to stand as they are, or by stirring both the beans and the enzyme solution in which the beans are immersed. The length of time of such enzymatic treatment by the use of an enzyme solution ranges from 30 to 180 minutes, preferably 60 to 120 minutes, in case both the beans and the enzyme solution are stirred; the duration of enzymatic treatment ranges from 1 to 6 hours, preferably 3 to 4 hours, when beans are left to stand in the enzyme solution. It has been noted that, in case the length of time of enzymatic treatment of beans is too short, no satisfactory effect of enzyme can be obtained.

Whereas, in case the enzymatic reaction continues too long, there could arise an adverse effect such that the taste of flavor of the product beans becomes degraded due to contamination by micro-organisms, or such that the beans per se become damaged during stirring.

In case beans are treated in an enzyme solution under the above-mentioned conditions, the enzyme will act upon the pectic intercellular substances or cellulosic substances existing in the cell walls of beans, uniformly and effectively destroying the cell tissues existing therearound, whereby improving the permeation of hot water into the core of each bean and also improving the ability of the beans to restore the initial boiled soft condition of raw beans, during the cooking or preparation of food by the use of the product dried beans. This is a feature of the present invention.

According to the present invention, at least once, usually once or twice, preferably twice, raw beans are boiled in water prior to subjecting the raw beans to enzymatic treatment, in order to ensure the efficiency of the enzyme treatment.

The step of boiling the beans in boiling water is carried out ordinarily at a temperature of the boiling point of the water employed or at a temperature in the vicinity of the boiling point of the water under normal pressure consecutively for 3 to 90 minutes. Through this boiling of raw beans, organic and inorganic components such as tannine, saponin and gummy substances and other substances which are contained in the seed coat and the seed lobe (cotyledon) of each bean and which are soluble in hot water and which would hamper the good taste and flavor of the raw beans are extracted and removed. Along therewith, during the boiling treatment of raw beans, the soft cells, i.e. parenchymatous cells, of these beans are caused to progressively become a mass of swollen cells, i.e. the cells are destroyed and the starch component of the cells is gelatinized, so that, in other words, the water content of the boiled material as well as the area of the contact of cells with the enzyme increase during the boiling treatment.

Accordingly, as a result of this boiling treatment, the water content of each bean will increase and the beans will become swollen, to thereby enhance the action and effect of the enzyme during the subsequent enzyme(s) treatment of the boiled beans, and to result in the substantial retainment of the taste and flavor of the original boiled beans by the product beans. In case, however, the boiling treatment of raw beans is omitted before subjecting the beans to an enzymatic treatment, it has been noted that the action of the enzyme during the subsequent enzymatic treatment is hampered, and the taste and flavor as well as the ability of the product dried beans to restore the initial boiled soft condition becomes markedly lowered. Thus, the omission of the boiling treatment of raw beans prior to enzymatic treatment is not desirable.

The operation of boiling raw beans to cause extraction and removal of the aforesaid substances which are soluble in hot water is usually called the operation of extracting astringency of beans. This boiling treatment is carried out usually 1 to 2 times, and occasionally as many as 3 times. It is preferable to add a softening promoter such as sodium- or potassium-polyphosphate during this boiling treatment, since such addition will enhance the action and effect of the enzyme. By repeating this boiling treatment twice, the extraction as well as the removal of such substances which are soluble in hot water, and the aforesaid gelatinization of starch components can both be carried out almost perfectly. It should be understood also that, after carrying out an initial astringency extracting operation and after discarding the extractant, i.e. the boiling water used, or after the second boiling treatment, the boiled raw beans may be washed with tap water or in a washing basin containing fresh water. Also, the boiled raw beans may be immersed in fresh water to concurrently cool and wash the boiled raw beans, prior to subjecting them to an enzymatic treatment.

Another preferred example of the pre-treatment of beans conducted prior to enzymatic treatment is to immerse raw beans in a fresh water prior to carrying out the aforesaid boiling treatment, i.e. astringency removal treatment, to cause the raw beans to absorb water. This immersion of raw beans in fresh water is usually called a preliminary immersion treatment, which causes the raw beans to become swollen and at the same time facilities the aforesaid extraction and removal of the substances which are soluble in hot water, and along therewith this preliminary treatment serves to enhance the action and effect of the enzymatic treatment. The temperature of water during this preliminary treatment is usually in the range of 5° to 60°, and if desired this preliminary treatment may be carried out at a temperature of the range of 60° to 95° C. The length of time of immersion is about 2 to 18 hours.

According to the present invention, it should be noted that the beans which have been subjected to said enzymatic treatment may be optionally subjected again to boiling treatment in boiling water; and then the beans are dried, and thus processed dried beans of the present invention ready for instant cooking can be obtained.

In case the beans which have been treated with an enzyme are thereafter boiled in boiling water, boiling will cause deactivation of a very small amount of enzyme still remaining in the beans and at the same time the starch component existing in the cells of the beans is caused to swell and become gelatinized, so that the degree of the starch of beans to be converted to α-type starch as well as the ability of these beans to restore the initial boiled soft condition can be improved. Therefore, the boiling treatment which is carried out after the enzymatic reaction constitutes also a preferred example and another feature of the present invention.

The boiling treatment in boiling water preferably is conducted at a temperature of 100° to 120° C. for about 20 to 80 minutes under normal atmospheric pressure, or for 10 to 40 minutes under a pressure.

If the boiling treatment of beans after enzymatic treatment is ommitted, it is desirable to conduct sufficient boiling of raw beans prior to an enzymatic treatment by carrying out this boiling treatment at least twice before the enzymatic treatment. The beans resulting from the boiling treatment following enzymatic treatment, or beans resulting from the enzymatic treatment, will be dried in the manner as will be described later.

If the beans which have been subjected to enzymatic treatment are not subjected again to boiling water treatment, the residual enzyme within the beans can be deactivated by subjecting such beans to a subsequent drying step, and thus the superior processed dried beans ready for use in instant cooking can be obtained.

The drying of the treated beans is usually carried out by heating the beans to a temperature in the range of 60° to 120° C. until they have a water content of about 15% or less by weight, preferably 8 to 12% by weight. If the water content of beans exceeds 15% by weight, the product dried beans undesirably tend to develope mold or moss during storage. On the other hand, if the water content of beans is too low, many cracks tend to develop in the product processed dried beans.

To prevent the development of cracks and fractures during the drying step, the treated beans desirably are coated with a solution of either sucrose or lactose either by the application of such coating to the beans or by immersing the treated beans in such solution before being dried, so that there desirably is formed a protective layer or film of sucrose or lactose on the surface of each bean. In case sucrose or lactose is used to form a protecting film, such a film will serve to add some sweetness to the product dried beans and will serve to enhance the taste and flavor in the product dried beans.

As stated above, the processed dried beans obtained according to the present invention which are ready for use in instant cooking are such that the textures or tissues of the beans have already been effectively destroyed and also are such that the particles of the starch component existing within the cells of the pasty beans have substantially been converted to α-type starch. Accordingly, the beans will promptly absorb hot water during the cooking, i.e. when hot water is poured thereto, and the hot water will quickly permeate into the core of each bean. As a result, all these beans will uniformly hydrate or restore, in a very short period of time, to their initial boiled soft condition. In addition, the hydrated dried beans possess the taste and flavor and feel to tongue which are peculiar to beans. Therefore, the product dried beans obtained according to the present invention are extremely useful in the preparation of instant foods such as instant "Zenzai", instant boiled beans, instant paste of beans, and so forth.

Description will hereunder be made with respect to some examples. The "appearance", the "restoring speed" and the taste evaluation which are shown in these examples are defined as follows.

(1) Appearance 300 sample pieces of the processed dried beans are grossly (macroscopically) examined for the scarcity of cracks and fractures that have been developed. The results are recorded in terms of "appearance".

(2) Restoring speed 10 grams of sample of the processed dried beans are immersed in 100 cc of hot water at a temperature of 90° to 95° C. The length of time required for the dried beans to restore substantially the same softness as that of the boiled same raw beans is checked.

(3) Taste evaluation 10 grams of sample of the processed dried beans are immersed in 100 cc of hot water held at a temperature of 93° to 95° C. for 2 minutes. Feel to tongue is evaluated in terms of score points of the below-mentioned references by 10 persons of the test panel:

| Evaluation Score | Remarks |
| --- | --- |
| 2 | Feel to tongue similar to that of boiled raw beans is noted, without any strange feeling. |
| 1 | The beans have portions giving a sense of a little resistive to teeth and also have portions which give a sense of stickiness. |
| 0 | The beans give a sense of strong resistance to teeth. |

EXAMPLE 1

3 kg of raw Adzuki beans are kept immersed for 16 hours in 6 liters of water at 20° C. (preliminary immersion). Thereafter, the Adzuki beans are boiled for 15 minutes in an oven containing 8 liters of boiling water under atmospheric pressure. Then, the liquid after this boiling treatment is removed to take out the boiled beans, and the beans are cooled in 6 liters of fresh water. Then, the resulting beans are immersed for 2.5 hours in 8 liters of aqueous solution of enzyme containing 18 g of Meicelase (0.6% relative to the weight of the beans) and also containing 18 g of Macerozyme (0.6% relative to the weight of the beans), said solution having been adjusted to have a pH of 3.5 by citric acid and being held at a temperature of 40° C., to carry out an enzymatic reaction. Thereafter, the beans are transferred into an autoclave containing 8 liters of water, and are boiled for 30 minutes under a pressure and at 118° C. Thereafter, the boiled beans are dried in a hot-air drier for 30 minutes at 90° C. The resulting dried beans thus obtained have a water content of 8%, with a very low development of cracks. The dried beans restore the initial boiled soft condition in 1.5 minutes in hot water. Taste evaluation is noted to be 17 points.

EXAMPLE 2

The procedure is similar to that of Example 1, excepting that an aqueous solution of pH of 3.5 containing 18 g of Cellulase Onozuka and held at a temperature of about 40° C. is used as an enzyme solution. The resulting dried Adzuki beans show a water content of 7.5%, a very low development of cracks. The restoring speed in hot water is 2.5 minutes and the taste evaluation is noted to be 15 points.

EXAMPLE 3

The procedure of Example 1 is repeated, excepting that an aqueous solution of pH 3.5 containing 18 g Macerozyme held at 40° C. is used as an enzyme solution. The resulting dried beans have a water content of 7.8%, with a fairly low development of cracks. The restoring speed in hot water shows to be 3.5 minutes, and the taste evaluation is noted to be 14 points.

EXAMPLE 4

3 kg of raw Adzuki beans are immersed in 6 liters of fresh water, followed by boiling for 15 minutes in an aqueous solution containing 25 g of a polyphosphate under normal pressure. Then, the boiled beans are removed out of the liquor, and they are boiled for 15 minutes in 8 liters of water under normal pressure. Thereafter, the beans are brought into contact with an enzyme solution in the same manner as stated in Example 1. The enzyme-treated beans are boiled again for 10 minutes at 118° C. under a pressure, and thereafter the beans are dried. The resulting dried beans have a water content of 7% and a low development of cracks. The restoring speed in hot water shows to be 1.5 minutes, and the taste evaluation is noted to be 18 points.

EXAMPLE 5

The procedure of Example 1 is repeated, excepting that the preliminary immersion in water of raw Adzuki beans is omitted. The resulting dried beans show a water content of 7.5%, with a low development of cracks. The restoring speed in hot water shows to be 2.5 minutes. The feel to tongue is evaluated to be 15 points.

EXAMPLE 6

The procedure of Example 1 is repeated, excepting that the Adzuki beans after experiencing the preliminary immersion step are boiled in boiling water for 80 minutes under atmospheric pressure, instead of boiling for 30 minutes in an autoclave at 118° C. under a pressure. The resulting dried beans have a water content of 8% and a slightly increased cracks. The restoring speed in hot water is noted to be 2.5 minutes, and the taste evaluation is noted to be 16 points.

EXAMPLE 7

3 kg of raw Adzuki beans are boiled for 15 minutes in a vessel containing 8 liters of water under normal pressure, followed by discarding the liquor to remove the boiled beans. Then, the beans are again boiled for 20 minutes in an autoclave containing 8 liters of water at 120° C. under a pressure, followed by subjecting the beans to an enzyme-treatment and a drying treatment in the same manner as that in Example 1. The resulting dried beans have a water content of 7%, a slightly increased development of cracks. The restoring speed in hot water is noted to be 25 minutes, and the taste evaluation is found to be 16 points.

EXAMPLE 8

The procedure in Example 1 is repeated, excepting that an aqueous solution containing 30 g of Driserase (1% based on the weight of the beans) and 30 g of Macerozyme (1% based on the weight of the beans) is used as an enzyme solution. The resulting dried Adzuki beans have a water content of 7%, with a low development of cracks. The restoring speed in hot water is noted to be 1.5 minutes, and the taste evaluation is found to be 17 points.

EXAMPLE 9

The procedure of Example 1 is repeated, excepting that an aqueous solution containing 30 g of Meicelase (1% based on the weight of the beans) and 30 g of Macerozyme (1% based on the weight of the beans) is used as an enzyme solution. The resulting dried beans have a water content of 7.5%, with a low development of cracks. The restoring speed in hot water is noted to be 1.5 minutes, and the taste evaluation is found to be 17 points.

EXAMPLE 10

The procedure of Example 7 is repeated, excepting that the enzyme-treated beans are immersed for 10 minutes in an aqueous solution of 30% sucrose at a temperature of 50° C., before the treated beans are dried. The resulting dried beans have a water content of 8%, with a very low development of cracks. The restoring speed in hot water is noted to be 2.0 minutes, and the taste evaluation is found to be 18 points, with a good flavor.

As in this Example, the formation of coating of sugar by the application of a solution of, for example, sucrose to the beans before drying can considerably effectively suppress and reduce the development of cracks in the beans during the drying step. Thus, the effect of such coating is remarkable.

EXAMPLE 11

The procedure of Example 1 is repeated, excepting that as an enzyme solution, those indicated in the following table 1 are used and that stirring is employed during the treatment. The results are summarized in the table.

Table

| Composition of Ensyme Solution | | | | Effect | |
| --- | --- | --- | --- | --- | --- |
| Cellulase | Content (%) | Pectinase | Content (%) | Cracks developed | Restoring speed(min.) | Taste evaluation |
| Driserase | 0.1 | — | — | Slightly many | 4.0 | 14 |
| " | 5.0 | — | — | Few | 2.5 | 17 |
| " | 6.0 | — | — | " | 2.5 | 16 |
| " | 0.04 | — | — | Very many | 6.0 | 6 |
| " | 0.4 | — | — | Slightly few | 2.5 | 16 |
| " | 1.0 | — | — | Slightly few | 2.0 | 17 |
| — | — | Soluble Sclase | 0.1 | Slightly many | 4.5 | 13 |
| — | — | Soluble Sclase | 6.0 | Slightly many | 3.0 | 16 |
| — | — | Soluble Sclase | 0.04 | Many | 7.0 | 5 |
| — | — | Soluble Sclase | 8.0 | Slightly many | 3.0 | 16 |
| Dricellase | 0.1 | Soluble Scalse | 0.1 | Slightly few | 3.0 | 16 |
| " | 3.0 | Soluble Sclase | 4.0 | Few | 1.5 | 18 |
| " | 0.3 | Soluble Sclase | 1.0 | " | 2.0 | 17 |
| " | 1.0 | Soluble Sclase | 0.3 | " | 1.5 | 18 |

Note:
The content of each enzyme is expressed as % based on the weight of the beans, and the amount of the enzyme solution is 6 liters.

CONTROL EXAMPLE 1 (An example wherein no boiling of beans is conducted before an enzymatic treatment)

This Control Example illustrates the importance of conducting the boiling of beans in boiling water before the beans are contacted by an enzyme solution.

The procedure of Example 1 is repeated, excepting that the boiling of Adzuki beans for 15 minutes in 8 liters of water under atmospheric pressure is omitted. The resulting dried beans have a water content of 0.7%, with many cracks. Even at the end of immerzion of the resulting beans in hot water for 15 minutes, the beans hardly restore the soft condition. The taste evaluation is noted to be 3 points.

CONTROL EXAMPLE 2 (An example where an enzymatic treatment is omitted)

This example illustrates the importance of treating the boiled beans with an enzyme solution.

The procedure of Example 1 is repeated, excepting that the enzyme-treatment is omitted. The resulting dried beans have a water content of 7%, with a low development of cracks. However, the dried beans do not restore the softness at the end of immersion in hot water for 25 minutes. The taste evaluation is found to be nil.

EXAMPLE 12

3 kg of raw Adzuki beans are immersed for 10 hours in 6 liters of fresh water at 20° C., followed by boiling for 15 minutes in a vessel containing a solution of 200 g of a polyphosphate in 8 liters of water under atmospheric pressure. After discarding the liquor, the boiled beans are further boiled for 15 minutes in 8 liters of water under atmospheric pressure and then the beans are removed therefrom. After being cooled, the beans are immersed for 2 hours in an aqueous solution of enzyme containing 240 g of Cellulase Onozuka (0.8% based on the weight of the beans) and 240 g of Macerozyme and adjusted to the pH value 5.0 with acetic acid, at a temperature of 36° C., for an enzymatic treatment. Then, the enzyme-treated beans are boiled for 40 minutes in 8 liters of water under atmospheric pressure. After being cooled, the beans are again immersed for 15 minutes in an aqueous solution of 20% lactose at a temperature of 50° C. After discarding the liquor, the beans are dried with heated air of 90° C. for 40 minutes. The resulting dried beans have a water content of 8%, a very low cracking property. The restoring speed in hot water is noted to be 1.5 minutes and the taste evaluation is found to be 19 points, with very good flavor.

EXAMPLE 13

3 kg of raw Broad beans are boiled for 20 minutes in 8 liters of water in a vessel under normal pressure and then they are removed, followed by boiling the beans for 30 minutes in an autoclave containing 8 liters of water at 120° C. under a pressure. After removing the beans out of the autoclave, the beans are cooled in 8 liters of fresh water at a temperature of 15° C. Then, the beans are immersed, with stirring, in an aqueous solution containing 30 g of Driserase (1% based on the weight of the beans) and 30 g of soluble Sclase at the pH of 4.2 at 30° C. for about 180 minutes. Then, the beans are boiled again for 20 minutes in an autoclave containing 8 liters of water at 110° C. under a pressure. After drying in heated air at 90° C., the resulting dried broad beans show a water content of 7%, with few cracks. The restoring speed in hot water is noted to be 3 minutes, and the taste evaluation is found to be 17 points.

The above procedure is applied to 3 kg of Kidney beans. The resulting dried kidney beans have a water content of 8%, with few cracks. The restoring speed in hot water is noted to be 3 minutes, and the taste evaluation is noted to be 16 points.

The above procedure is repeated, except that before drying, the enzyme-treated beans are immersed for 1 hour in an aqueous solution of 25% sucrose at 60° C. The resulting dried broad beans and kidney beans both show the restoring speed in hot water of about 3 minutes, and an excellent taste evaluation which is found to be 18 points with much improved flavor, respectively.

CONTROL EXAMPLE 3

3 kg of raw Adzuki beans are immersed for 2 hours in 6 liters of water at 20° C., followed by immersing the beans for 2 hours in an aqueous solution containing 18 g of Driserase and 18 g of Macerozyme at a pH value of 3.5 at 40° C., and then, as in the state of being immersed, they are heated and boiled for 15 minutes under atmospheric pressure. Then, the beans are boiled again for 30 minutes in an autoclave containing 8 liters of water at 118° C. under a pressure. The boiled beans are then dried for 30 minutes in heated air at 90° C. The resulting dried Adzuki beans have a water content of 8%, a fairly low cracking property, a very low restoring speed, not exhibiting sufficient restorability even when immersed in hot water for 15 minutes, and the taste evaluation of 2 points with very good flavor.

CONTROL EXAMPLE 4

The procedure of Control Example 3 is repeated, excepting that 3 kg of raw Broad beans and 3 kg of Butter beans are used separately instead of 3 kg of Adzuki beans. The resulting dried Broad beans and the dried Butter beans both show a water content of 7.5%, a low cracking property, a very low restoring speed showing no restorability even when immersed in hot water for 30 minutes, and a taste evaluation of zero, with very poor flavor.

CONTROL EXAMPLE 5

8 kg of raw Adzuki beans are immersed for 5 hours in an aqueous solution as that used in Example 1 at 60° C., followed by boiling the beans under atmospheric pressure for 90 minutes. The boiled beans are then washed with fresh water, and dried in heated air at 90° C. for 30 minutes. The resulting dried beans have a water content of 7.0%, a fairly few cracks, a very low restoring speed not being sufficiently restorable even being immersed in hot water for 20 minutes, and a taste evaluation of zero, with very poor flavor.

CONTROL EXAMPLE 6

The procedure of Control Example 5 is repeated, excepting that 3 kg of Butter beans, Broad beans and Baby Lima beans are used separately, instead of use of Adzuki beans. The respective resulting dried beans show a very low restoring speed not being restorable even when immersed in hot water for about 30 minutes, though little cracked, and the taste evaluation is zero, with very poor flavor.

CONTROL EXAMPLE 7 (An example where an analogous enzyme is used)

The procedure of Example 2 is repeated, excepting that 18 g of Toyo-Cellulase produced by Fusarium Moniliforme are used instead of 18 g of Cellulase Onozuka. The resulting dried Adzuki beans have a number of cracks, a water content of 7.1%, a restoring speed in hot water of 15 minutes and a taste evaluation of 3 points.

As will be clear from this result, Toyo-Cellulase is more effective than Cellulase Onozuka when Toyo-Cellulase alone is used. Driserase and Meicelase, when used alone, is much more effective than Toyo-Cellulase alone.

What is claimed is:

1. Processed dried beans suitable for instant cooking, which are quickly restored to the condition of boiled soft raw beans simply by pouring hot water onto the processed dried beans, said beans being rich in starch and poor in both protein and fat, the improvement wherein the starch component in said dried beans has been converted to a α-type starch and that the cell tissues of said beans have been treated with an enzyme selected from a group consisting of cellulase produced by *Trichoderma viride*, cellulase produced by *Irpex lacteus* and cellulase produced by *Trichoderma koningi* and a mixture of said cellulase and pectinase produced by *Rhizopus arrhizus* and pectinase produced by *Coniothrium diplodiella*, for a period of time sufficient to destroy the cellulosic substances or cellulosic and pectic substances of said cell tissues.

2. Processed dried beans according to claim 1, said beans having a sucrose coating thereon.

3. Processed dried beans according to claim 1, said beans having a lactose coating thereon.

4. Processed dried beans according to claim 1 wherein said beans are selected from a group consisting of Adzuki beans, Peyin beans, Kidney beans, Scarlet rummers, Lima beans, Peas, Broad beans, Cuba beans and Catiangs.

5. A method for producing processed dried beans which are quickly restored to the condition of boiled soft raw beans by pouring hot water onto the processed dried beans, said beans being rich in starch and poor in both protein and fat, the improvement comprising the successive steps of
(1) boiling raw beans at least once in water,
(2) subjecting said boiled beans to an enzymatic-treatment by contacting said boiled beans with an aqueous solution containing an enzyme acting on the pectic intercellular cellulosic materials of the bean cell walls, for a period of time sufficient to destroy the cellulosic substances or cellulosic and pectic substances of said cell tissues, said enzyme selected from the group consisting of cellulase produced by *Trichoderma viride* cellulase produced by *Irpex lacteus* and cellulase produced by *Trichoderma koningi* and a mixture of said cellulase and pectinase produced by *Rhizopus arrhizus* and pectinase produced by *Coniothrium diplodiella* at a pH of acidic to neutral such that the starch component of said beans becomes gelatinized, and thereafter
(3) drying said beans.

6. A method according to claim 5, wherein said enzyme solution contains cellulose in an amount of 0.1 to 5.0% by weight based on the weight of said beans being brought into contact with said enzyme solution.

7. A method according to claim 5, wherein said enzyme solution contains both cellulase and pectinase in an amount, based on the weight of said beans being brought into contact with said enzyme solution, of 0.1 to 3.0% by weight of cellulase and 0.1 to 4.0% by weight of pectinase.

8. A method according to claim 5, wherein said enzyme solution has a pH of 3.0 to 7.0.

9. A method according to claim 6, wherein said enzyme solution has a pH of 3.0 to 5.0.

10. A method according to claim 7, wherein said enzyme solution has a pH of 3.5 to 5.0.

11. A method according to claim 5, further comprising preliminary immersing of said raw beans in water at a temperature of 5° to 95° C. for 2 to 8 hours before said boiling of raw beans in water.

12. A method according to claim 5, wherein said boiling in water prior to said enzymatic treatment is carried out twice.

13. A method according to claim 5, wherein said boiling in water prior to said enzymatic treatment is carried out for 20 to 80 minutes under normal pressure.

14. A method according to claim 5, wherein said boiling in water prior to said enzymatic treatment is carried out at a temperature of 110° to 120° C. for 10 to 40 minutes under pressure.

15. A method according to claim 5, wherein said boiling in water prior to said enzymatic treatment is carried out in the presence of a softening promoter selected from a group consisting of sodium polyphosphate and potassium polyphosphate.

16. A method according to claim 5, wherein said enzymetreatment is carried out with stirring for 30 to 180 minutes.

17. A method according to claim 5, wherein said enzymetreatment is carried out by maintaining said boiled beans quietly in said enzyme solution for 0.5 to 6 hours.

18. A method according to claim 5, further comprising coating said enzyme-treated beans with sucrose by immersing said beans in a solution of sucrose before said drying.

19. A method according to claim 18, wherein said coating is formed by the use of lactose.

20. A method according to claim 5, wherein said drying is carried out at a temperature of 60° to 120° C. until said dried beans have a water content of not greater than 15% by weight.

21. A method according to claim 5, wherein said beans are selected from a group consisting of Adzuki beans, Peyin beans, Kidney beans, Scarlet rummers, Lima beans, Peas, Broad beans, Cuba beans and Catiangs.

* * * * *